Figure 1:
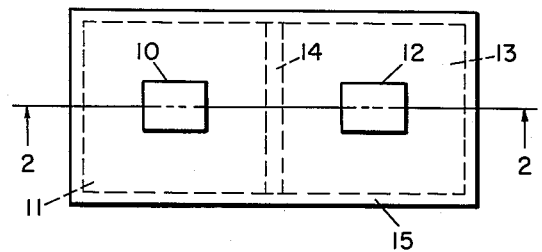

May 8, 1962 J. McCALLUM ET AL 3,033,910
ELECTRIC CURRENT GENERATING CELLS
Filed May 23, 1958

United States Patent Office 3,033,910
Patented May 8, 1962

3,033,910
ELECTRIC CURRENT GENERATING CELLS
John McCallum, Worthington, Ohio, Theodore B. Johnson, Stratford, Conn., and Walter E. Ditmars, Jr., and Leslie D. McGraw, Columbus, Ohio, assignors, by direct and mesne assignments, to Remington Arms Company, Inc., Bridgeport, Conn., a corporation of Delaware
Filed May 23, 1958, Ser. No. 737,191
13 Claims. (Cl. 136—120)

This invention relates to electric current generating cells, particularly to primary cells having negative electrodes (anodes) comprising titanium and titanium alloys in conjunction with electrolytes in which the pH is less than about 7.5. These anodes are not to be confused with the electrochemically inert "electrodes" or conductive elements commonly used as supports for the active electrode materials in current generating cells or as a means of passing current to the electrolyte of electrolytic cells. The anodes, or negative electrodes, of this invention are in direct contact with the electrolyte, thereby becoming electrochemically active sources of electromotive force. Upon drawing current from the cells these anodes are electrochemically consumed in the process. Thus is provided a method of supplying electrical energy to a load that comprises connecting the load in circuit with a primary current generating cell as disclosed herein. The present application is a continuation in part of our application Serial No. 706,890, filed January 3, 1958; which was a continuation in part of applications Serial No. 466,582, filed November 3, 1954, and Serial No. 349,098, filed April 15, 1953.

The cells of the present invention provide high currents at high closed circuit voltages. The current capacities of the present cells are generally substantially greater than those of the long-life low-drain cells of our copending application Serial No. 706,890, while the shelf life is generally shorter in the present cells. Despite the shorter shelf life, the high-current capacity at high closed circuit voltages of the present cells make them particularly useful for various applications requiring high drains for short periods. The cells providing the highest drains, useful as reserve-type cells, may be stored dry until they are about to be used, when the electrolyte is added and the cells become activated. The properties of the cells can be varied and controlled over a wide range by varying the electrolyte ingredients and the pH. Throughout the pH range from 7.5 to less than 0 it is preferred to include a fluoride in the electrolyte. In the weak acid electrolytes, having pH from about 7.5 to 4.5, the effect of the fluoride in the electrolyte predominates. In highly acid electrolytes, having pH less than about 2.5, the effect of the high acidity predominates. The electrolytes of medium acidity, having pH from about 4.5 to 2.5, have characteristics intermediate between those of the predominantly fluoride electrolytes and those of the predominantly acid electrolytes.

Figure 2:
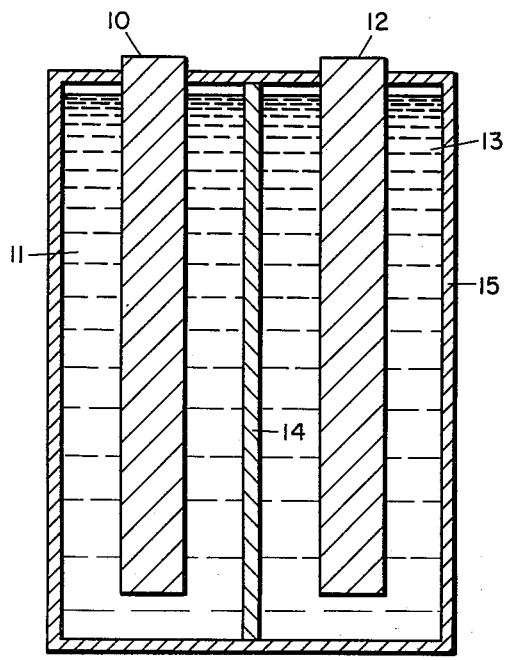

In the drawing:
FIGURE 1 is a top view of a primary cell according to the present invention having an anode containing titanium and a diaphragm separating an anode electrolyte from a cathode electrolyte; and
FIGURE 2 is a sectional view, taken on the plane 2—2 of FIG. 1 of the same primary cell.

Fluorides that are useful in the present cells include the alkaline earth and alkali fluorides (including ammonium fluoride), such as calcium, sodium, potassium and ammonium fluorides and bifluorides, and hydrofluoric acid. Mixtures of these fluorides may be used.

The fluoride-containing electrolyte may also contain a bromide, such as potassium, sodium or ammonium bromide or hydrobromic acid for somewhat improved characteristics. Acidity may be regulated by addition of acids, such as hydrochloric, hydrofluoric, hydrobromic or sulfuric acids, or by the addition of acidic salts, such as the bisulfates, ammonium chloride and ammonium sulfate.

When fluorides are used as electrolytes in contact with a titanium-containing anode, a solid reducible fluoride may be used as the cathode. A cell of this construction is characterized by an exceptionally long and uniform discharge life, since the fluoride ions that are continuously lost from the electrolyte at the anode are replaced by the fluoride cathode. This method of replacing fluoride in the electrolyte is advantageous as compared with the use of a fluoride reserve in the electrolyte itself. Among the fluorides suitable for use as electrodes of cells of this invention are cerium tetrafluoride, titanium tetrafluoride, and potassium-titanium fluoride.

A cell comprising a titanium negative electrode, a positive electrode of cerium fluoride, and an electrolyte of ammonium fluoride, has an open circuit potential of 1.55 to 1.6 volts.

A cell consisting essentially of a titanium negative electrode, a potassium titanium fluoride positive electrode, and an ammonium fluoride electrolyte, has an open circuit potential of 1.4 volts.

A cell having a titanium negative electrode, an ammonium fluoride electrolyte, and a positive electrode of silver fluoride obtained by the reaction of silver nitrate and ammonium fluoride, has an open circuit potential of 1.75 to 1.8 volts.

The highly acid electrolytes provide extremely high current capacities with somewhat decreased shelf life. Corrosion inhibitors such as quinaldine may be used in the highly acid electrolytes to inhibit spontaneous corrosion and thereby increase the shelf life. The quinaldine causes the electrolyte to form a chemisorbed film on the anode, which inhibits corrosion. Some oxidizing agents, such as potassium dichromate, are also effective as corrosion inhibitors.

EXAMPLES

Typical electrolyte-depolarizer pastes are as follows:

*Example I*

Solid ingredients:                                    Grams
  Manganese dioxide_____ 60
  Carbon black_____ 20
  Ammonium fluoride_____ 20
Fluid ingredients:
  Water _____ 144
  Titanium tetrachloride_____ 12
  Ammonium fluoride—
    in suspension or solution_____ 44

The solids are moistened with about 120 grams of the fluid.

*Example II*

Solid ingredients:                                    Grams
  Manganese dioxide_____ 60
  Carbon black_____ 5
  Calcium fluoride_____ 35
Fluid ingredients:
  Water _____ 144
  Titanium dioxide_____ 12
  Amonium fluoride—
    in suspension or solution_____ 44

The solids are moistened with about 60 grams of the fluid.
Such solids as ammonium fluoride and titanium dioxide are first added to the liquid in order to provide their uniform distribution in the finished paste. Neither titanium tetrachloride nor titanium dioxide, as used in the above specific examples, appears to enter into the electrochemical reaction, and practical cells have been prepared without using either ingredient.

Numerous cells have been made comprising one or the other of the above pastes, a carbon collector rod, a titanium negative electrode, and the usual separating membrane. As a standard of comparison, similar cells were made comprising a zinc negative electrode, a carbon collector rod, and an electrolyte paste similar to the pastes above mentioned except that ammonium chloride was used instead of ammonium fluoride, and zinc chloride instead of titanium tetrachloride or titanium dioxide. The titanium cells had open-circuit voltages ranging from about 1.5 to slightly over 1.8—an average of about 1.67. The voltage range for the zinc cells was from about 1.45 to 1.656—an average of about 1.57. The open circuit weight loss of the titanium electrode in the ammonium fluoride-titanium tetrachloride electrolyte was about 0.34 milligram per hour (2.05 coulombs per hour). This compares with a weight loss for the zinc cells of 1.19 milligrams per hour (3.51 coulombs per hour). Thus the titanium cell shows improved shelf life, as measured by the self-discharge or open circuit loss of the anode. Under conditions of current drainage the titanium containing anodes show an advantage in the number of coulombs obtainable from a given weight of anode or, alternatively, for equal coulombs drawn less weight of titanium is needed. Under a current drain of about 1 milliampere per square inch of anode the titanium weight loss is less than half the zinc weight loss in the zinc electrode cell, for equal coulombs, examples being as follows:

| System | | | Weight loss g./hr. |
|---|---|---|---|
| Anode | Electrolyte | Cathode | |
| Ti | $NH_4F$, $TiCl_4$, C, $MnO_2$ | C | $8.0 \times 10^{-4}$ |
| Zn | $NH_4Cl$, $ZnCl_2$, C, $MnO_2$ | C | $18 \times 10^{-4}$ |
| Ti | $CaF$, $TiO_2$, C, $MnO_2$ | C | $8.6 \times 10^{-4}$ |

The invention further contemplates utilizing the resistance of titanium to chemical attack and the resistance of fluorides to oxidative decomposition in the production of a high voltage cell. Such cells may comprise a titanium electrode in a fluoride electrolyte of the type above described, a diaphragm used as a separator, and a positive electrode of suitable material such as platinum or carbon in a depolarizer comprising a strong oxidizer, such as ammonium peroxydisulphate. These cells have the general construction

| Titanium anode 10 | Fluoride electrolyte 11 | Depolarizer Mix 13 | Cathode 12 |
|---|---|---|---|
| | (Separator 14) | | | for example:

$$Ti/CaF_2//(NH_4)_2S_2O_8/C$$
$$10 \quad 11 \quad 14 \quad 13 \quad 12$$

If desired, the container 15 and the separator 14 can be in close contact with the anode 10, the separator 14 being impregnated with the electrolyte 11. Preferably, part of the electrolyte is in admixture with the depolarizer and a conductivity-increasing medium in the form of a paste. By way of example, one electrolyte-depolarizer paste may comprise calcium fluoride and ammonium peroxydisulfate mixed with about 10 percent acetylene black and moistened with a saturated solution of ammonium fluoride. Such cells had open circuit voltages of 2.0 to 2.1 and supplied currents of 1.0 milliampere per square inch for 24 hours without appreciable loss of voltage, visible gassing or other evidence of deterioration.

Other typical experiments illustrating the characteristics of various titanium and titanium alloy anode primary cells are shown in the data of the following table. In these examples, the anode voltages were measured in reference to a saturated calomel electrode. For actual cell operation, various well-known cathodes, such as mercuric oxide, nickel oxide, lead dioxide, and carbon-air electrodes were used. The cell potentials in these cases may be readily calculated by known methods.

Thus in Example 24, titanium was drained at 2000 ma./in.$^2$ in hydrofluoric acid-hydrochloric acid electroylte at 0.95 v. vs. the saturated calomel electrode. With a lead dioxide cathode the cell potential becomes about 1.95 v. at 2000 ma./sq. in. of titanium. This compares with 1.25 v. of 1000 ma./sq. in. for the well known zinc-potassium hydroxide-silver oxide cell. Other illustrations of very high drain rate titanium cells are Examples 25 and 26 of the table. The advantage of fluoride electrolyte under less acidic conditions also is illustrated in other examples in the table: Nos. 4 and 5 show that the addition of 0.2 molar potassium fluoride to a 1 molar potassium bromide-0.1 molar catechol electrolyte increased the polarizing current density 16 fold. Other such examples are 16–18, 19–23, 28–30, 35–36 and 44–46 and 41.

The extended drainages indicated in the table were taken at times varying from two hours to four weeks.

In the table, column 5 indicates whether current at the density shown may be drawn for several hours from the primary cells at constant potential. Column 6 is a critical current density at which the voltage of the primary cell abruptly decreases. Column 7 denotes shelf life as measured by corrosion of the anode, the shelf life being inversely proportional to the gassing rate.

PROPERTIES OF PRIMARY CELLS COMPRISING ANODES OF TITANIUM AND ITS ALLOYS AT AMBIENT ROOM TEMPERATURES (25° C.±5)

| | Anode | Electrolyte | Additive | Drainage | | | Shelf life—Open circuit gassing rate, cc./day/sq. in. |
|---|---|---|---|---|---|---|---|
| | | | | Potential in volts (vs. SCE) at ma./sq in. | Is Extended drainage possible? at ma./sq. in. | Polarizing current density, ma./sq. in. | |
| 1 | Ti metal | 5.0 M9KF | 1.0 M HF | −0.8 at 5.0 | | 20.0 | 0.017. |
| 2 | do | 0.5 M KF (pH 5.5) | None | −1.25 at 1.0 | Yes, at less than 1.0 | 2.0 | Not measured. |
| 3 | do | 0.3 M KF (pH 5.5) | 0.3 M $K_2C_2O_4$ | −1.17 at 4.0 | Yes, at 4.0 | 20.0 | Do. |
| 4 | do | 1.0 M KBr | 0.1 M catechol | | | 0.5 | Do. |
| 5 | do | do | 0.1 M catechol, 0.2 M KF | −1.04 at 2.0 | Yes, at 2.0 | 8.0 | Do. |
| 6 | do | do | 0.1 M catechol, 0.2 M KF, 0.1 M $K_2C_2O_4$ | −1.10 at 3.0 | Yes, at 3.0 | 5.0 | Do. |
| 7 | do | 1.0 M KF (pH 5.5) | 0.2 M catechol | −1.25 at 2.0 | Yes, at 2.0 | 8.0 | Do. |
| 8 | do | 0.5 M KF (pH 5.5) | 0.5 M KBr | −1.14 at 2.0 | do | 6.0 | Do. |
| 9 | do | 2.5 M KF (pH 5.0) | 2.5 M KBr | −0.83 at 0.5 | Yes, at 0.5 | 2.0 | Do. |
| 10 | do | 4.5 M KF (pH 4.4) | None | −0.8 at 2.0 | Yes, at 2.0 | 18.2 | Very slight. |
| 11 | do | 5.6 M $NH_4F$ (pH 4.3) | 1.0 M HF | −1.16 at 4.0 | Yes, at 4.0 | 20.0 | 3.4. |
| 12 | do | do | 1.0 M HF + 0.1 M $K_2CrO_4$ | −1.05 at 30.0 | | 200.0 | 1.55. |
| 13 | do | 3.0 M $NH_4Cl$ | 5.0 cc. HF/1 of solution +15.0 g. $K_2Cr_2O_7$/l. | −0.39 at 4.0 | Yes, at 4.0 | 30.0 | No gassing observed on open or closed circuit. |
| 14 | do | 5.9 M $NH_4F$ HF (pH 2.5) | 0.1 M $K_2Cr_2O_7$ | −1.10 at 100.0 | Yes, at 100.0 | 500.0 | Vigorous. |

PROPERTIES OF PRIMARY CELLS COMPRISING ANODES OF TITANIUM AND ITS ALLOYS AT AMBIENT ROOM TEMPERATURES (25° C.±5)—Continued

| | Anode | Electrolyte | Additive | Drainage | | | Shelf life—Open circuit gassing rate, cc./day/sq. in. |
|---|---|---|---|---|---|---|---|
| | | | | Potential in volts (vs. SCE) at ma./sq in. | Is Extended drainage possible? at ma./sq in. | Polarizing current density, ma./sq. in. | |
| 15 | Ti Metal | 4.4 M $NH_4FHF$ | 0.2 M $K_2Cr_2O_7$ | −1.01 at 50.0 | Yes, at 50.0 | | |
| 16 | do | 3.0 M $NH_4Cl$ (pH 1.0) | 0.125 M HCl | −0.56 at 0.2 | Yes, at 0.2 | 1.0 | No observable gassing. |
| 17 | do | do | 0.25 M HCl 1.0 M $NH_4F$ | −1.10 at 5.0 | Yes, at 5.0 | 150.0 | High. |
| 18 | do | do | 0.25 M HCl, 1.0 M $NH_4F$, 0.1 M $K_2Cr_2O_7$ | −0.54 at 4.0 | Yes, at 4.0 | 25.0 | Very little gassing. |
| 19 | do | 2.2 M $KHSO_4$ | | Drainage not possible | | | |
| 20 | do | 4.4 M $NH_4HSO_4$ | | Drainage not possible at 1.0 ma/sq in | | | |
| 21 | do | do | 1.0 M phenol | do | | | |
| 22 | do | do | 1.0 M $HC_2H_3O_2$ | do | | | |
| 23 | do | do | 0.01 M $NH_4F$ | −0.72 at 3.0 | Yes, at 3.0 | 5.0 | Vigorous. |
| 24 | do | 3.0 M HCl+3 M HF | | −0.95 at 2,000.0 | Yes, at 2,000.0 | 3,400.0 | One shot battery, gassing not important. |
| 25 | do | 6.0 M HF | | −0.5 at 1,400.0 | Yes, at 1,400.0 | 1,500.0 | Do. |
| 26 | do | 5.0 M HCl, 1.0 M HF | | −0.6 at 1,500.0 | Yes, at 1,500.0 | 2,000.0 | Do. |
| 27 | Ti-20.0 Cr [1] | 5.6 M $NH_4F$ (pH 4.3) | 1.0 M HF | −0.98 at 8.0 | Yes, at 8.0 | 300.0 | High. |
| 28 | do | 4.4 M $NH_4HSO_4$ | | Polarized at 1.0 ma/sq in | | | No gassing evident. |
| 29 | do | do | 1.0 M $HC_2H_3O_2$ | do | | | Do. |
| 30 | do | do | 0.01 M $NH_4F$ | −0.77 at 1.0 | Yes, at 1.0 | 3.0 | Showed some improvement over Ti metal. |
| 31 | Ti-30.0 Mo (quenched) | 3.3 M $NH_4F \cdot HF$ (pH 3.3) | None | −0.83 at 5.0 | Yes, at 5.0 | 360.0 | 254.0 |
| 32 | do | 5.6 M $NH_4F$ (pH 4.3) | 1.0 M HF | −0.86 at 4.0 | Yes, at 4.0 | 64.0 | 31.0 |
| 33 | do | do | 1.0 M HF+0.1 M $V_2O_5$ | −0.78 at 5.0 | Yes, at 5.0 | 75.0 | 7.2 |
| 34 | do | do | 1.0 M HF+0.05 M acridine | −0.87 at 5.0 | do | 40.0 | 45.0 |
| 35 | do | 3.0 M $HN_4Cl$ (pH 4.2) | 2.0 M $NH_4F$+50.0 cc. conc. HCl/1 solution | −0.85 at 4.0 | Yes, at 4.0 | >32.0 | Slight. |
| 36 | do | 3.0 M NH Cl (pH 4.0) | 0.125 M HCl | Could not be activated or drained | | | |
| 37 | do | do | 0.25 M HCl+1.0 M $NH_4F$ | −0.80 at 50. | Yes- at 2.0 | | Do. |
| 38 | Ti-33.0 Ni | 5.6 M $NH_4F$ (pH 4.3) | 1.0 M HF | −0.63 at 4.0 | Yes, at 4.0 | >200.0 | |
| 39 | Ti-33.0 Al | 3.0 M $NH_4Cl$ | 0.25 M HCl, 1.0 M $NH_4F$, 0.1 M $K_2Cr_2O_6$ | −0.72 at 5.0 ma | (?) | | 4.51 cc. |
| 40 | do | 30.0 weight percent $H_2SO_4$ | None | −0.62 at 2.0 | Yes, at 2.0 | 3.0 | Slight closed circuit, vigorous circuit gassing. |
| 41 | do | 4.4 M $NH_4HSO_4$ | 0.01 M $NH_4F$ | −0.73 at 5.0 ma | Yes, at 5.0 ma | 20.0 | Very high. |
| 42 | do | do | Ditto + 2.6 M quinaldine | −0.83 at 1.0 ma | Yes, at 1.0 | 2.0 | Gassing almost entirely inhibited. |
| 43 | do | do | 0.05 M $NH_4F$, 2.6 M quinaldine | −0.86 at 5.0 | Yes, at 5.0 | | Gassing only slightly inhibited. |
| 44 | do | do | | Polarized at 1.0 ma/in.[2] | | | |
| 45 | do | do | 1.0 M phenol | −0.63 at 1.0 | Yes, at 1.0 | 2.0 | Very high. |
| 46 | do | do | 1.0 M $HC_2H_3O_2$ | Polarized at 1.0 ma/in.[2] | | | Not measured. |
| 47 | Ti-26.0 Si | 5.6 M $NH_4F$ (pH 4.3) | 1.0 M HF | −1.08 at 5.0 | Yes, at 5.0 | 70.0 | High. |
| 48 | Ti-10.0 Cu | do | do | −0.77 at 8.0 | Yes, at 8.0 | 150.0 | Do. |
| 49 | Ti-40.0 Cu | do | do | −0.69 at 8.0 | Yes, at 8.0 | 15.0 | Do. |
| 50 | do | do | do | −0.75 at 4.0 | Yes, at 4.0 | 15.0 | 0.02. |
| 51 | Ti metal | 40.0 wt percent $H_2SO_4$ | | −0.52 at 3.0 | Yes, at 3.0 | | Slight. |
| 52 | do | 50.0 wt percent $H_2SO_4$ | | −0.53 at 12.0 | Yes, at 12.0 | | Not measured. |

[1] Numbers indicate weight percent of alloyed elements.

What is claimed is:

1. A primary current generating cell comprising a cathode, an anode comprising essentially titanium, and an aqueous electrolyte in which the pH is less than about 7.5, said electrolyte consisting essentially of a material of the group consisting of hydrofluoric acid; ammonium fluoride; ammonium fluoride and hydrofluoric acid; hydrochloric acid and hydrofluoric acid; and a major amount of ammonium chloride and minor amounts of hydrochloric acid and ammonium fluoride.

2. A primary current generating cell having an anode comprising at least 50 atomic percent titanium, said anode being in contact with an aqueous acid electrolyte consisting essentially of a material of the group consisting of hydrofluoric acid; ammonium fluoride; ammonium fluoride and hydrofluoric acid; hydrochloric acid and hydrofluoric acid; and a major amount of ammonium chloride and minor amounts of hydrochloric acid and ammonium fluoride.

3. A primary current generating cell comprising a cathode, an anode consisting essentially of titanium, and an aqueous electrolyte consisting essentially of hydrofluoric acid.

4. A primary current generating cell comprising a cathode, an anode consisting essentially of titanium, and an aqueous electrolyte consisting essentially of hydrochloric acid and hydrofluoric acid.

5. A primary current generating cell comprising a cathode, an anode consisting essentially of titanium, and an aqueous electrolyte consisting essentially of a major amount of ammonium chloride and minor amounts of hydrochloric acid and ammonium fluoride.

6. A primary current generating cell comprising a cathode, an anode consisting essentially of about 20 weight percent chromium, balance titanium, and an aqueous electrolyte consisting essentially of a major amount of ammonium fluoride and a minor amount of hydrofluoric acid.

7. A primary current generating cell comprising a cathode, an anode consisting essentially of about 30 weight percent molybdenum, balance titanium, and an aqueous electrolyte consisting essentially of ammonium fluoride and hydrofluoric acid.

8. A primary current generating cell comprising a cathode, an anode consisting essentially of about 30 weight percent nickel, balance titanium, and an aqueous electrolyte consisting essentially of a major amount of ammonium fluoride and a minor amount of hydrofluoric acid.

9. A primary current generating cell comprising a cathode, an anode comprising essentially titanium and an aqueous electrolyte consisting essentially of ammonium fluoride and hydrofluoric acid.

10. A primary current generating cell comprising a fluoride cathode, an anode comprising essentially, titanium and an aqueous electrolyte consisting essentially of ammonium fluoride.

11. A primary current generating cell comprising a cathode, an anode consisting essentially of titanium, and an electrolyte comprising a major amount of ammonium fluoride and minor amounts of hydrofluoric acid and potassium chromate.

12. A primary current generating cell comprising a cathode, an anode consisting essentially of titanium, and an electrolyte comprising a major amount of ammonium fluoride and hydrofluoric acid and a minor amount of potassium dichromate.

13. A primary current generating cell having an anode comprising at least 50 atomic percent titanium, said anode being in contact with an acid electrolyte containing a small amount of potassium dichromate.

References Cited in the file of this patent

UNITED STATES PATENTS 2,631,115  Fox _____ Mar. 10, 1953

OTHER REFERENCES

Gmelins Handbuch der Anorganishchen Chemie, 8" Aulf. system No. 41, "Titan" (1951), p. 188.

Handbook on Titanium Metal, pp. 37–42, 7th Ed., 1953.